Patented July 16, 1935

2,008,006

UNITED STATES PATENT OFFICE 2,008,006

PROCESS FOR THE PRODUCTION OF FURFUROL FROM CELLULOSE AND CELLULOSE CONTAINING MATERIALS

Alexander Classen, Aachen, Germany, assignor to Arthur H. Fleming, Pasadena, Calif.

No Drawing. Application December 2, 1931, Serial No. 578,611. In Germany December 2, 1930

7 Claims. (Cl. 260—54)

It is well known that in the process of saccharification of cellulose-containing materials by means of acids small amounts of furfurol may be obtained as by-product. According to a former proposal of the inventor the cellulose containing primary materials were saccharified, for example, by treating them with three different acids in such a way that the conversion of the cellulose was mainly effected by hydrochloric acid or sulphuric acid, the process being carried through in the first case in presence of sulphuric acid and sulphurous acid, in the second case in presence of hydrochloric and sulphurous acid. In this way glucose fit for fermentation was obtained as main product, while furfurol in quantities amounting to about 2 to 3% of the starting material (dry wood substance) was formed as by-product. An industrial utilization of this known process as means for the production of furfurol was out of question in view of the small outputs.

The present invention has for its object the production of furfurol from cellulose or materials containing cellulose under conditions which render it possible to obtain furfurol as main product.

In carrying out the invention one may, for example, saccharify the cellulose of the starting material, for example wood made into small pieces, straw or the like, in a manner known per se, by treating it with acids for hydrolyzing cellulose, and treat the hydrolyzed material in the presence or absence of undissolved components (lignine substance) at temperatures above 100° C. and at superatmospheric pressure with substances which, as for example sulphur dioxide gas, are capable of converting the higher sugars into furfurol.

Instead of sulphur dioxide gas other compounds capable of producing furfurol from the acidified and hydrolyzed mass may be used, for example sulphur compounds, which under the given conditions when acted upon for example by hydrochloric acid gas are able to produce sulphur dioxide, like the sulphites, hydrosulphites, thiosulphites etc.

As has been found it is advisable to convert the cellulose-containing starting material at first in a manner known per se into a form soluble in acid. This can for example be attained by treating the starting material, for example wood-meal, sawdust or the like, with a concentrated, if desired, an over-concentrated acid, preferably with hydrochloric acid, while cooling, preferably simultaneously agitating the mass. One may for example treat the cellulose-containing starting material in the presence of small amounts of liquid, for example with its natural content of moisture, or when using dry or predried starting materials, after moderate wetting with for example water or hydrochloric acid, in a revolving drum with hydrochloric acid gas. In this way the cellulose is converted into an acid-soluble form, all undesirable side reactions, as for example the formation of sugar, being avoided as far as possible.

The acid product of decomposition thus obtained is now hydrolyzed according to known methods, for example by bringing it to temperatures fit for promoting hydrolysis. The hydrolysis can also be effected in a manner known per se, for example by introducing water vapour (steam) into the closed vessel containing the decomposed cellulose, for example a revolving drum, and thereby bringing the mass rapidly to the temperature suitable for the saccharification. In some cases it has proved advantageous to remove by suction or like methods hydrochloric acid gas present in excess before introducing the water vapour. In this way a product is obtained which consists of a mixture of higher sugars and monoses and which, in case wood or the like has been used, still contains undissolved components, chiefly lignine substances.

In order to further work up this mixture one may for example introduce sulphur dioxide at temperatures above 100° C., into the autoclave until saturation is reached, and continue the heating for example by introducing water vapour into the jacket of the autoclave, until the higher sugars are converted into the desired furfurol. It has been found that in general a heating time of 30 to 60 minutes is sufficient. After the reaction is complete the volatile components may be obtained by evacuating or like measures for example in form of a mixture of furfurol, hydrochloric acid gas, sulphur dioxide gas and water vapour and they may be worked up by known methods, for example by condensation, distillation or rectification. In this way one can easily separate the formed furfurol, the boiling point of which lies at a temperature of 56° at 12 mm., from the hydrochloric and the sulphurous acid. The liquid remaining in the autoclave also still contains material quantities of furfurol which can be obtained by heating and evacuating.

The conversion of the higher sugars obtained from the cellulose into furfurol may be effected in the presence of the acid, for example hydrochloric acid, which had been used for the decomposition, in general however, it has proved more advantageous before introducing the sulphur dioxide gas to remove partly the hydrochloric acid present, if this has not already been done before. The reaction producing the furfurol may be carried through in the presence of the undissolved substance (lignine substance), however one may also separate the solution of the sugar formed, from the undissolved substance and work it up separately. After, for example, the sugar solution has been separated by leaching the hydrolyzed product and after it has been de-acidified, or if necessary concentrated and de-acidified, it will in some cases be useful to add a suitable acid, preferably hydrochloric acid, before continuing the treatment, by which the furfurol is to be obtained. It is for example also possible to saccharify cellulose-containing material decomposed by hydrochloric acid by heating it to temperatures suitable for saccharification, for example by introducing water vapour and to further treat the higher sugars by introducing sulphur dioxide gas at temperatures above 100° in closed vessels in order to obtain the furfurol.

If the cellulose-containing starting material is at first converted into acid-soluble form the acid decomposed material obtained may be worked up for the production of furfurol by subjecting the decomposed material simultaneously to the action of sulphur dioxide gas and water vapour at temperatures above 100° at a superatmospheric pressure. In this case too it has been found advantageous, before the further working up of the material for the production of furfurol, to remove part of the acid used for the decomposition of the cellulose-containing starting material, which for example can be effected by evacuating the decomposition vessel or by passing inert gases or vapours through it. It is for example also possible to remove a part, if desired the main part, of the hydrochloric acid present by passing water vapour through the mass and thereupon to force into the reaction vessel the mixture of sulphur dioxide gas and for example water vapour under pressure, which mixture is needed for the production of the furfurol.

When decomposing the cellulose-containing starting material in a revolving autoclave one may, after the process of decomposition has been carried through, introduce a mixture of water vapour at a superatmospheric pressure and of sulphur dioxide gas, whereby raising the temperature of the contents of the vessel to above 100°, and then carry on the process of furfurol formation at a superatmospheric pressure.

The manner of working to be adopted in a certain case, the height of the temperature, of the pressure and the time of reaction will depend upon the nature of the starting material, for example on the nature of the wood, on the previous treatment etc. While known processes of the saccharification of wood aim at producing monoses for fermentation in quantities as high as possible, for example by subjecting the mixtures of higher sugars and monoses at first obtained by hydrolysis of cellulose to an after-treatment, for example by heating in aqueous solution in presence of small quantities of acid in order to convert the higher sugars into monoses, according to the present invention the higher sugars formed are converted into furfurol by the action of sulphur dioxide and the like. The invention allows yields up to 30% and more, referred to the cellulose-containing starting material, to be obtained, depending upon the nature of the starting material used. The furfural may be used for a number of purposes, for example in the film industry, in the industries of varnishes and soaps, for the production of artificial resins, of maleic acid and of other organic acids.

*Example*

100 kg. sawdust, which has been lightly wetted with hydrochloric acid is saturated with hydrochloric acid gas in a revolving autoclave while strongly cooling. After the conversion of the cellulose into hydrochloric acid soluble form, which process may require for example 45 to 60 minutes, the hydrochloric acid gas in excess is removed by exhaustion. Hereupon a mixture of sulphur dioxide gas and water vapour under pressure is introduced into the autoclave and the latter is kept revolving at temperatures above 100° C. The formation of furfurol is then generally complete after 30 to 60 minutes. After the reaction has come to an end a mixture of furfurol, sulphur dioxide, hydrochloric acid and water vapour is obtained by evacuation and worked up by customary methods. Also from the liquid remaining in the autoclave the furfurol still present therein is withdrawn according to usual methods. The yield of furfurol depends of course on the content of cellulose in the starting material and amounts to up to about 25 liters on 100 kg. of dry wood substance.

What I claim is:—

1. In a process of producing furfurol from acid-treated material composed essentially of cellulose and capable of hydrolysis with the formation of sugars, the step of subjecting such acid-treated material to the action of sulfur dioxide at a superatmospheric pressure and a temperature above 100° C. in the presence of water vapor.

2. In a process of producing furfurol from a material composed essentially of cellulose, the step of subjecting a mass of such material, digested with a hydrogen-halide gas to the action of sulfur dioxide at a superatmospheric pressure and a temperature above 100° C. in the presence of water vapor.

3. In a process of producing furfurol from a material composed essentially of cellulose, the step of subjecting a mass of such material, digested with a hydrochloric acid gas to the action of sulfur dioxide at a superatmospheric pressure and a temperature above 100° C. in the presence of water vapor.

4. In a process of producing furfurol from acid-treated material composed essentially of cellulose and capable of hydrolysis with the formation of sugars, the step of adding substances capable of liberating sulfur dioxide to such cellulosic material and heating to a temperature above 100° C. at a superatmospheric pressure in the presence of water vapor.

5. A process of teating material composed essentially of cellulose which comprises: treating such cellulosic material with gaseous hydrogen chloride, agitating and cooling the material during such treatment and then subjecting the product of such treatment to the action of sulfur dioxide at a superatmospheric pressure and a temperature above 100° C. in the presence of water vapor.

6. A process of treating materials composed essentially of cellulose which comprises: treating such cellulosic material with gaseous hydrogen chloride while cooling and agitating the mixture to convert cellulose into acid soluble form without appreciable formation of sugars; then hydrolyzing the acid treated material and subjecting the same to the action of sulfur dioxide at a superatmospheric pressure and a temperature above 100° C. in the presence of water vapor.

7. A process of treating materials composed essentially of cellulose which comprises: treating such cellulosic material with gaseous hydrogen chloride while cooling and agitating the mixture to convert cellulose into acid soluble form without appreciable formation of sugars; then hydrolyzing the acid treated material, partially deacidifying the hydrolyzed material and then subjecting the material to the action of sulfur dioxide at a superatmospheric pressure at a temperature above 100° C.

ALEXANDER CLASSEN.